US006103989A

United States Patent [19]

Jennings et al.

[11] Patent Number: 6,103,989

[45] Date of Patent: Aug. 15, 2000

[54] SYSTEM AND METHOD FOR FORMING DISCRETE LASER-ETCHED LABELS FROM CONTINUOUS LABEL STOCK

[75] Inventors: Warren Jennings; Ronald P. Macken, both of Santa Rosa, Calif.

[73] Assignee: Lasercraft, Inc., Santa Rosa, Calif.

[21] Appl. No.: 09/020,104

[22] Filed: Feb. 9, 1998

[51] Int. Cl.[7] .......... B23K 26/36

[52] U.S. Cl. .......... 219/121.67; 219/121.68; 219/121.69; 219/121.72; 156/249; 156/272.8

[58] Field of Search .......... 219/121.6, 121.67, 219/121.68, 121.69, 121.72, 121.82, 121.85; 156/152, 184, 249, 252, 272.8, 379.8

[56] References Cited

U.S. PATENT DOCUMENTS

| | | | |
|---|---|---|---|
| 4,430,548 | 2/1984 | Macken | 219/121.67 |
| 4,549,063 | 10/1985 | Ang et al. | 219/121.69 |
| 4,874,919 | 10/1989 | Bransden et al. | 219/121.68 |
| 5,151,572 | 9/1992 | Jack | 219/121.69 |
| 5,421,933 | 6/1995 | Nedblake et al. . | |
| 5,487,807 | 1/1996 | Nedblake et al. . | |
| 5,624,520 | 4/1997 | Nedblake et al. | 156/249 |
| 5,679,199 | 10/1997 | Nedblake et al. . | |
| 5,681,412 | 10/1997 | Nedblake et al. . | |
| 5,779,832 | 7/1998 | Kocher | 156/152 X |

FOREIGN PATENT DOCUMENTS

| | | |
|---|---|---|
| 0650153 | 4/1995 | European Pat. Off. . |
| 4125007 | 1/1993 | Germany . |
| 2-123394 | 5/1990 | Japan . |

*Primary Examiner*—Gregory Mills
*Attorney, Agent, or Firm*—Carr & Ferrell LLP; Charles B. Katz; Aaron Wininger

[57] ABSTRACT

A system for forming discrete etched adhesive labels from continuous label stock comprises a de-laminator, a laser etching module, a re-laminator and a cutting module. The de-laminator separates and displaces the release liner from the face stock. The laser etching module scans a high power density laser beam over the separated face stock to produce a predetermined pattern of etched regions. The etched face stock is then re-attached to the functionally intact release liner by the re-laminator. Finally, the cutting module cuts through the face stock at regular intervals to form discrete adhesive labels.

9 Claims, 6 Drawing Sheets

SYSTEM AND METHOD FOR FORMING DISCRETE LASER-ETCHED LABELS FROM CONTINUOUS LABEL STOCK

BACKGROUND OF THE INVENTION

1. Field of the Invention

This invention relates generally to adhesive labels, and more particularly to a system and method for forming discrete etched adhesive labels from continuous label stock.

2. Description of the Background Art

Vendors of consumer products commonly affix adhesive labels to the product for the purposes of identification and aesthetics. To generate enhanced consumer appeal, the vendor may use adhesive labels having an unusual and/or visually attractive design. One particularly effective method of producing attractive labels is to provide them with an intricate geometry, which may comprise one or more etched regions formed in the label.

Adhesive labels are typically manufactured from rolls or strips of continuous label stock. The label stock comprises a face stock having a front surface and an adhesive-coated rear surface. Underlying the face stock is a release liner. The release liner is provided with a low-adhesion surface contacting the face stock such that the release liner may be easily separated from the face stock just prior to the application of the adhesive labels to the labeled products. The inclusion of the release liner prevents contamination of the adhesive surface, allows the label stock to be handled without undesirable adherence to adjacent surfaces, and provides structural integrity.

Various techniques may be employed to produce etched regions in label stock. While mechanical methods are available for this purpose, laser-based methods offer substantial benefits in terms of precision and versatility. U.S. Pat. No. 4,430,548, issued to John Macken, discloses an exemplary laser-based technique wherein a laser beam having sufficient power density is directed by a template and optical components onto a workpiece such that a predetermined area or areas of the workpiece is or are vaporized, thereby producing the desired pattern of etched regions.

One disadvantage associated with the use of the foregoing laser-based technique to produce etched labels is that the laser beam will typically vaporize not only the face stock, but also a portion of the release liner underlying the etched region of the face stock. Damage to the release liner can compromise the structural integrity of the label stock and thereby lead to tearing or breakage. When tearing or breakage occurs during processing of the label stock, the operation of the label-processing equipment must be stopped while the damaged label stock is removed and discarded and new label stock is threaded through the equipment. Multiple shutdowns necessitated by tearing or breakage of label stock reduces the overall availability of the processing equipment and may significantly raise the costs associated with its operation. Furthermore, damage to the release liner may render separation of the release liner from the face stock difficult, thus greatly complicating the task of applying the labels to the products.

Damage to the release liner may be reduced by precisely setting the laser beam power density and scanning speed such that only the face stock is vaporized, leaving the release liner substantially intact. However, this method is difficult to implement and may be thwarted by any nonuniformities in the properties of the face stock, such as variations of thickness or composition.

In view of the foregoing discussion, there is a need for a system and method for producing etched adhesive labels from continuous label stock wherein the release liner is not damaged by the action of the laser utilized to create etched regions.

SUMMARY OF THE INVENTION

In accordance with the present invention, a system and method are disclosed for forming etched labels from continuous label stock using a laser-based technique. The invention enables the production of etched labels without damaging the release liner by physically separating the release liner from the face stock before the face stock is etched by a laser (the term etched or etching is used herein to signify ablation or vaporization of the face stock by a laser beam to produce a desired pattern of one or more etched regions). The release liner is then moved outside of the beam path of the laser, thereby leaving the release liner substantially undamaged. The release liner is then reattached to the etched face stock. In an alternative embodiment, the original release liner removed from the face stock is discarded, and a new release liner is applied to the etched face stock. The processed continuous label stock, comprising the etched face stock and release liner, may then be cut to form individual discrete labels, while leaving the release stock functionally intact.

It will be appreciated that the term "functionally intact" denotes a condition wherein the release liner maintains its structural integrity and is resistant to tearing or breakage. The release liner may incur minor damage (such as small holes, abrasions or cuts) in the etching, cutting or other processes, yet remain functionally intact, so long as the minor damage does not substantially compromise the structural integrity of the release liner.

The label-making system of the present invention preferably comprises four functional modules: a de-laminator; a laser etching module; a re-laminator; and a cutting module. The de-laminator module comprises apparatus configured to separate the release liner from the face stock. The de-laminator further includes structures to displace the release liner from the face stock such that the release liner is positioned outside of the path of the laser beam, thereby leaving the release liner functionally intact. The etching module comprises structures for scanning a laser beam over the separated face stock in a manner that produces a desired pattern of etching thereof.

The re-laminator includes structures to reattach the etched face stock to the functionally intact release liner. In the alternative embodiment, the re-laminator attaches a new release liner to the etched face stock. Finally, the cutting module cuts the face stock at regular intervals to thereby produce individual discrete labels. The cutting module may comprise a mechanical cutting device such as a die cutter, or may alternatively comprise a laser-based cutting system.

In accordance with the foregoing description, a laser-based label-making system is provided wherein laser-etched adhesive labels may be produced from continuous label stock and damage to the release liner is minimized or avoided.

DETAILED DESCRIPTION OF PREFERRED EMBODIMENTS

The present invention relates to an improvement in forming discrete etched labels from continuous label stock. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiments described and depicted herein, but is to be accorded the widest scope consistent with the principles and features described herein.

Figure 2:
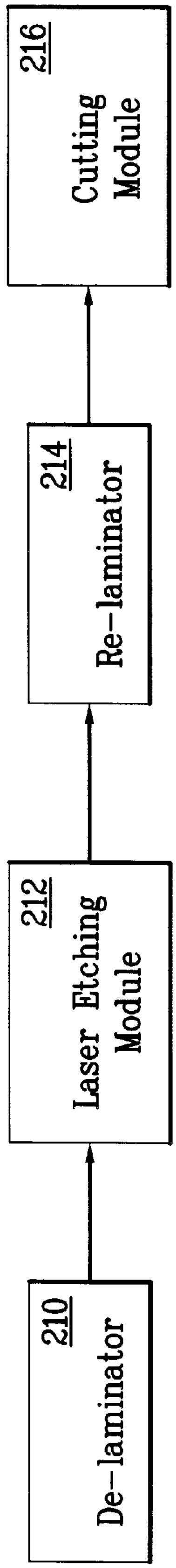
FIG. 2 is a block diagram of the general components of the preferred embodiment of the system.

Reference is initially directed to FIG. 2, which depicts in block form the essential components of the label-making system of the present invention. The system is specifically designed to produce discrete etched adhesive labels from a continuous roll or strip of label stock, the label stock comprising a face stock having a front surface and an adhesive rear surface, and a release liner underlying and having one surface contacting the rear surface of the face stock. The system generally comprises four functional modules arranged sequentially: a de-laminator 210, a laser etching module 212, a re-laminator 214 and a cutting module 216. The de-laminator 210 first separates the release liner from the face stock of the continuous label stock and then moves the release liner outside of the path of the laser beam. Next, the laser etching module 212 scans a laser beam in a predetermined pattern over the face stock to form a pattern of etched regions on the face stock. The re-laminator 214 then reattaches the etched face stock to the functionally intact release liner. Finally, the cutting module cuts the face stock at regular intervals to form discrete individual labels.

The label-making system also preferably includes transport means (not shown) for transporting the label stock through and between the various functional modules. The transport means, which are well known in the art and need not be described in detail herein, are preferably configured to move the label stock at variable speeds. The system may optionally further comprise a printer module (not shown) for printing designs on the front surface of the face stock. Alternatively, the label stock may be pre-printed.

Figure 4:
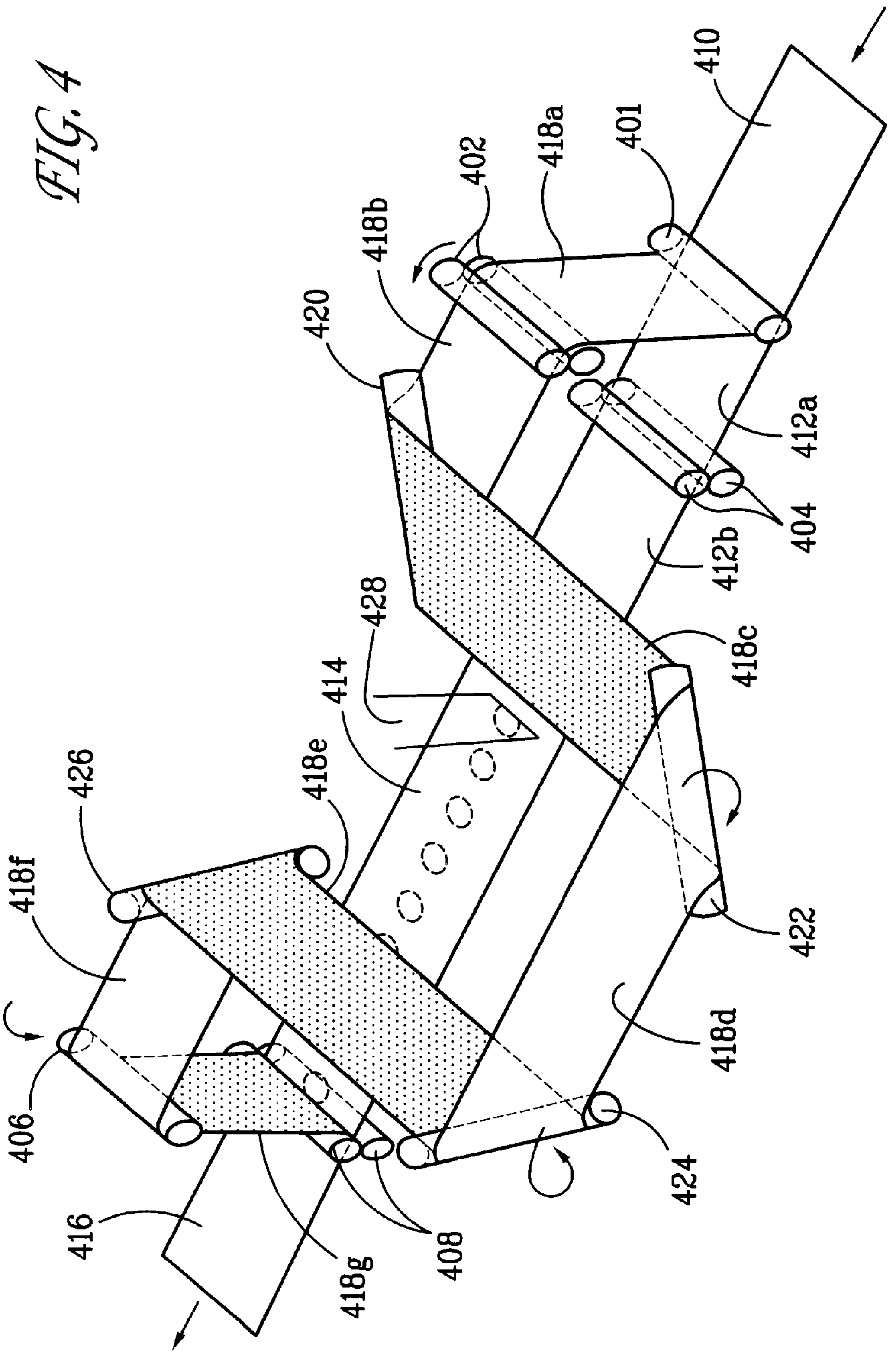
FIG. 4 is a diagram of an embodiment of the de-laminator and re-laminator modules.

Referring now to FIG. 4, a generalized diagram of a first embodiment of the de-laminator 210 and re-laminator 214 is shown. The de-laminator module 210 comprises separation roller 401, release liner tensioner 402, face stock tensioner 404, and turning bars 420 and 422. Label stock 410 is fed into the de-laminator module 210 in the direction of motion indicated by the arrow. Separation of release liner 418*a* from the face stock 412*a* happens at separation roller 401. The separated release liner 418*a* passes through release liner tensioner 402 which applies an adjustable tension to the release liner 418*b*. The tensioned release liner 418*b* wraps over turning bar 420 such that the release liner 418*c* travels transversely to its original direction of motion. The separated face stock 412*a* passes through face stock tensioner 404. The tensions are optimized in release liner tensioner 402 and face stock tensioner 404 to prevent breakage of face stock 412. Turning bar 422 directs the release liner 418*c* such that release liner 418*d* travels substantially parallel to the direction of motion of face stock 412*b*. In this manner, release liner 418 is displaced from face stock 412 but remains substantially coplanar therewith through its travel path.

Figure 5:
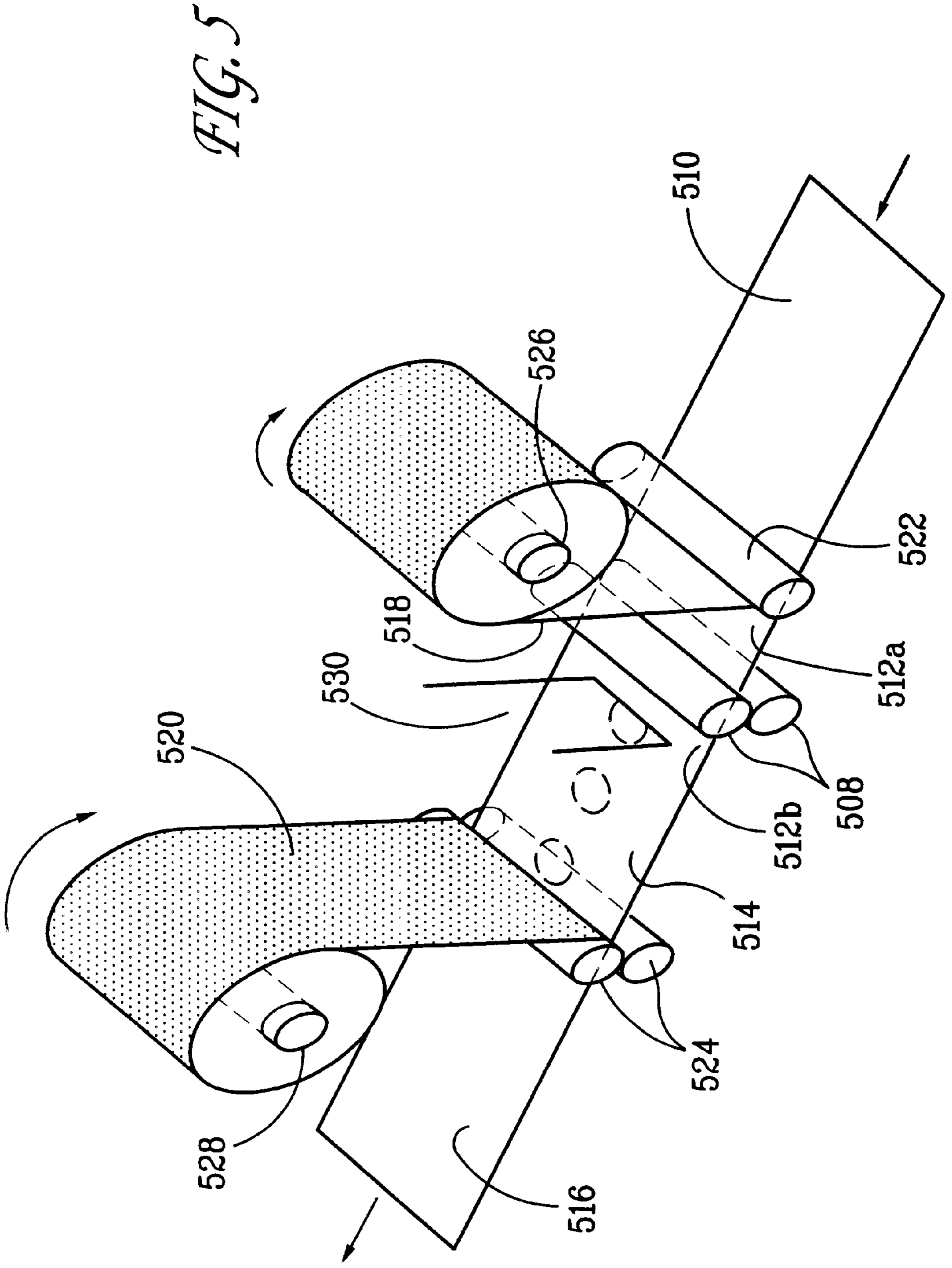
FIG. 5 is a diagram of a second embodiment of the de-laminator and re-laminator modules.

A second embodiment of de-laminator module 210 and re-laminator module 214 is shown in FIG. 5. The second embodiment of de-laminator module 210 comprises rollers 522 and 526. The label stock 510 is fed into the de-laminator module 210 in the direction of motion indicated by the arrow. Roller 522 separates face stock 512 from release liner 518. Roller 522 also directs release liner 518 upwards so that release liner 518 is travelling transversely to its original direction. As in the first embodiment of the de-laminator 210 shown in FIG. 4, face stock tensioner 508 tension is adjusted wherein the tension of face stock 512*b* is optimized to prevent breakage of the face stock 512. Release liner 518 is then collected on a roll on roller 526.

Once de-laminator 210 has separated face stock 412*a* from release liner 418*a* and displaced release liner 418*b* and 418*c* out of the path of laser beam 428, face stock 414 is etched by laser etching module 212.

Figure 1:
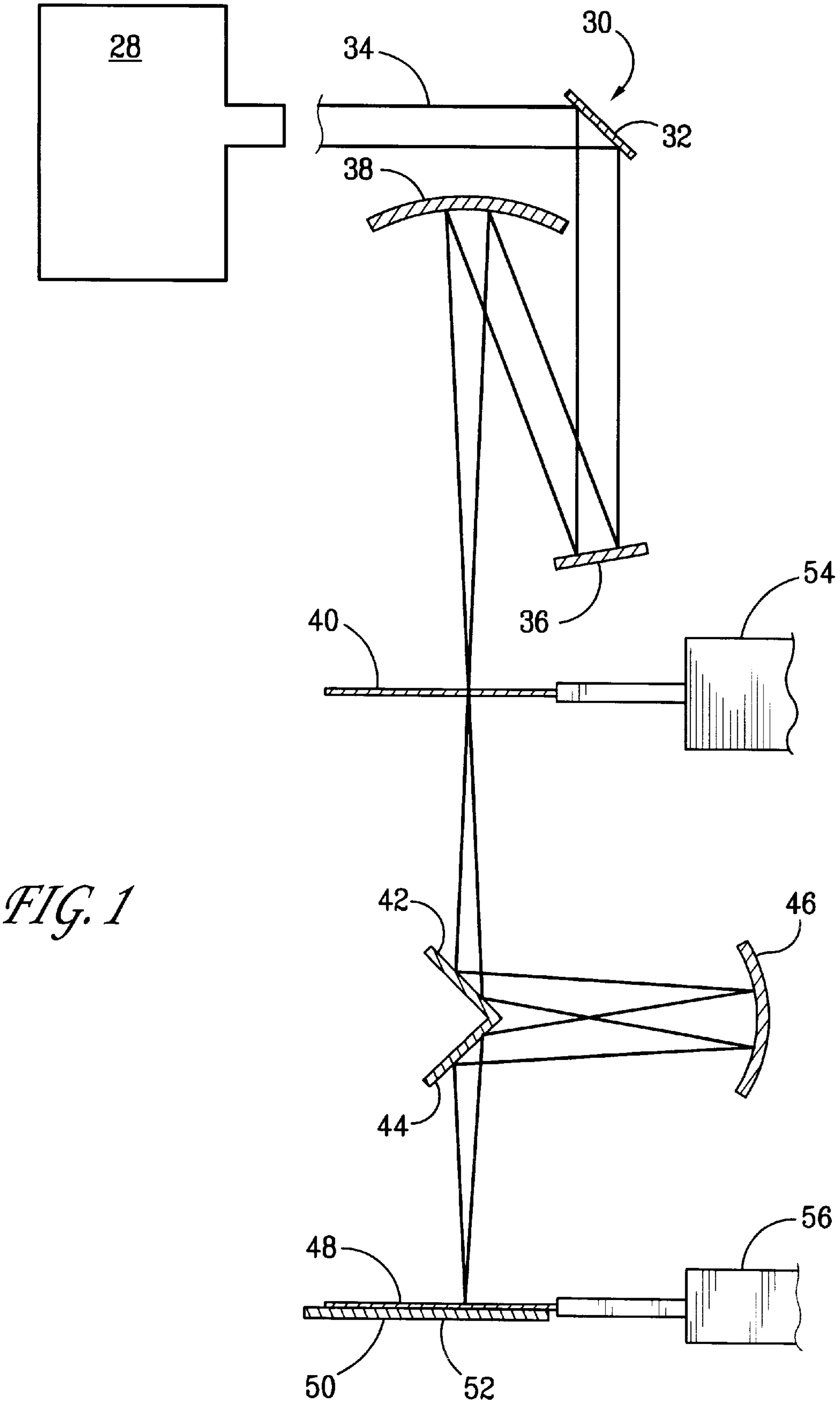
FIG. 1 is a schematic diagram of a prior art laser-based etching system.

A variety of laser etching systems and methods are known in the art, and hence a detailed description of laser etching module is omitted for the purpose of brevity. The general components of an exemplary prior art laser etching system are depicted in FIG. 1. The system comprises a laser 28 configured to emit a beam of radiation 34. The laser 28 may comprise, for example, a continuous beam carbon-dioxide laser. The beam 34 is directed and focussed by scanning mirror 32 and mirrors 36 and 38 onto template 40, which is adapted with open areas corresponding to the pattern of etched regions to be produced in the workpiece 48, which in the present application comprises the label face stock. The portion of beam 34 passing through the open areas of template 40 are directed and focussed by mirrors 42, 44, 46 onto workpiece 48 (face stock). The beam 34 is of sufficient power density such that the portions of the face stock impinged on by the beam are vaporized, thereby creating a predetermined pattern of etched areas in the face stock. It is appreciated that the present invention is not limited to use with the foregoing etching system, which has been provided by way of example only.

It is noted that according to the generalized embodiment of system 201, as shown in FIG. 4, laser beam 428 is directed onto the rear surface of face stock 412*b*–414. However, in an equally feasible embodiment, laser beam 428 can be directed on the front surface of face stock 412*b*–414.

Referring now to FIG. 4, an embodiment of re-laminator 214 is shown. The re-laminator 214 comprises turning bars 424 and 426, roller 406 and re-lamination rollers 408. After laser etching module 212 finishes etching a predetermined pattern into face stock 412*b*, de-laminator module 210 feeds release liner 418*d* and etched face stock 414 into re-laminator 214. Turning bar 424 directs releaser liner 418*d* transversely to its original direction of motion. Turning bar 426 then redirects release liner 418*e* back into the same direction as now-etched face stock 414. Roller 406 directs release liner 418*f* downward toward face stock 414. Re-lamination rollers 408 connect release liner 418 to the adhesive side of etched face stock 414 to form etched continuous strip of label stock 416.

Referring now to FIG. 5, a second configuration of re-laminator module 214 is shown. In the embodiment shown in FIG. 5, a new release liner is applied to the etched face stock. Re-laminator 214 comprises re-lamination rollers 524 and roller 528. Roller 528 holds new release liner 520 that is to be applied to etched face stock 514. Re-lamination roller 524 applies new release liner 520 to etched face stock 514 to form etched continuous strip of label stock 516.

Following attachment of release liner 418*g* to etched face stock 414, the etched face stock 414 is cut at regular intervals by cutting module 216 to produce discrete adhesive labels. Cutting module 216 may comprise a mechanical cutting device, such as a die cutter, or may alternatively comprise a laser-based cutting technique. In either embodiment, the cutting module is configured to cut only through the face stock layer such that the release liner remains functionally intact.

Figure 6:
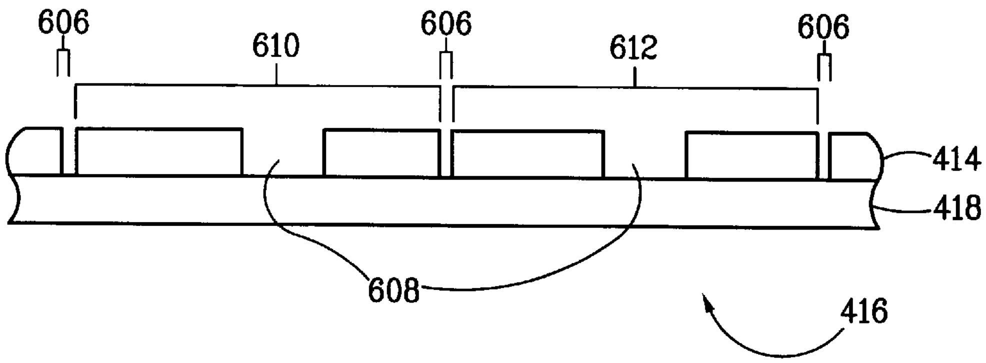
FIG. 6 is a fragmentary cross-sectional view of an etched continuous strip of label stock.
Figure 7:
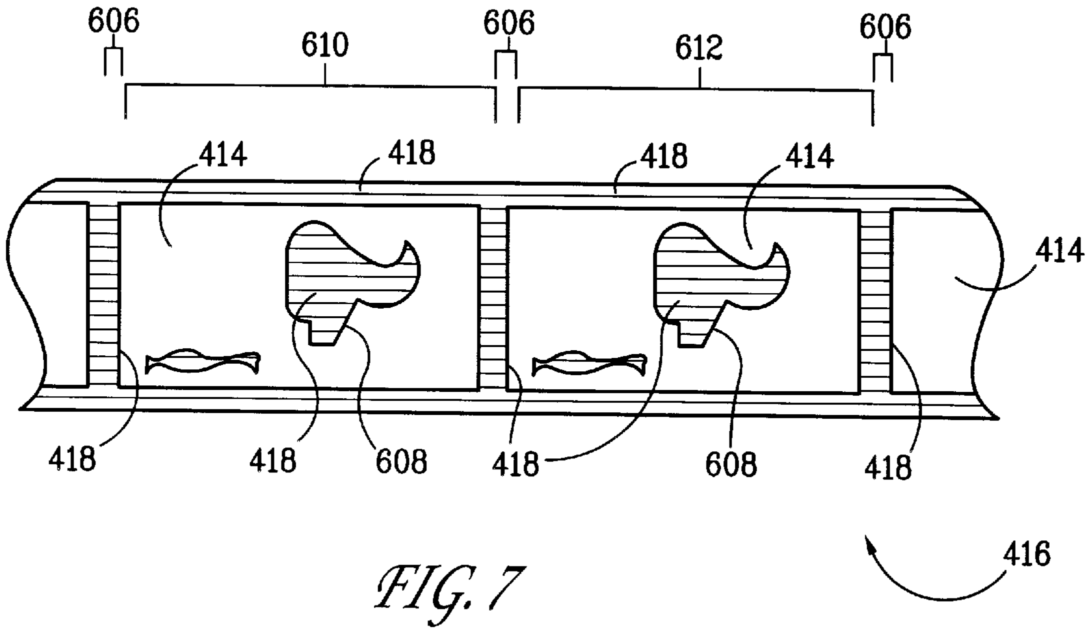
FIG. 7 is a fragmentary top plan view of an etched continuous strip of label stock.

Reference is now directed to FIGS. 6 and 7, which respectively depict fragmentary cross-sectional and top plan views of etched labels formed by the system of the present invention. The continuous label stock is divided along its length into a multiplicity of individual discrete adhesive labels. Two adjacent labels 610 and 612 are depicted in the figures. Laser etching module 212 is operable to produce identical etched regions 608 in the face stock 412*a,* forming etched face stock 414, after the face stock 412*a* has been separated from release liner 418*d.* While a single etched region is depicted for each label 610 and 612, laser etching module 214 may form multiple etched regions in each label. Release liner 418*a,* having been positioned outside of the path of laser beam 428 during laser etching operations, is substantially whole and undamaged.

Cuts 606 in face stock 414, effected by cutting module 216, define the boundaries of adjacent labels 610 and 612 and enable removal of the labels from the face stock from the release liner by automated or manual means prior to application of the label to the corresponding product. It is also noted that while cuts 606 are linear and thereby define generally rectangular labels, irregular cuts may be employed to produce labels having a more complex shape.

Figure 3:
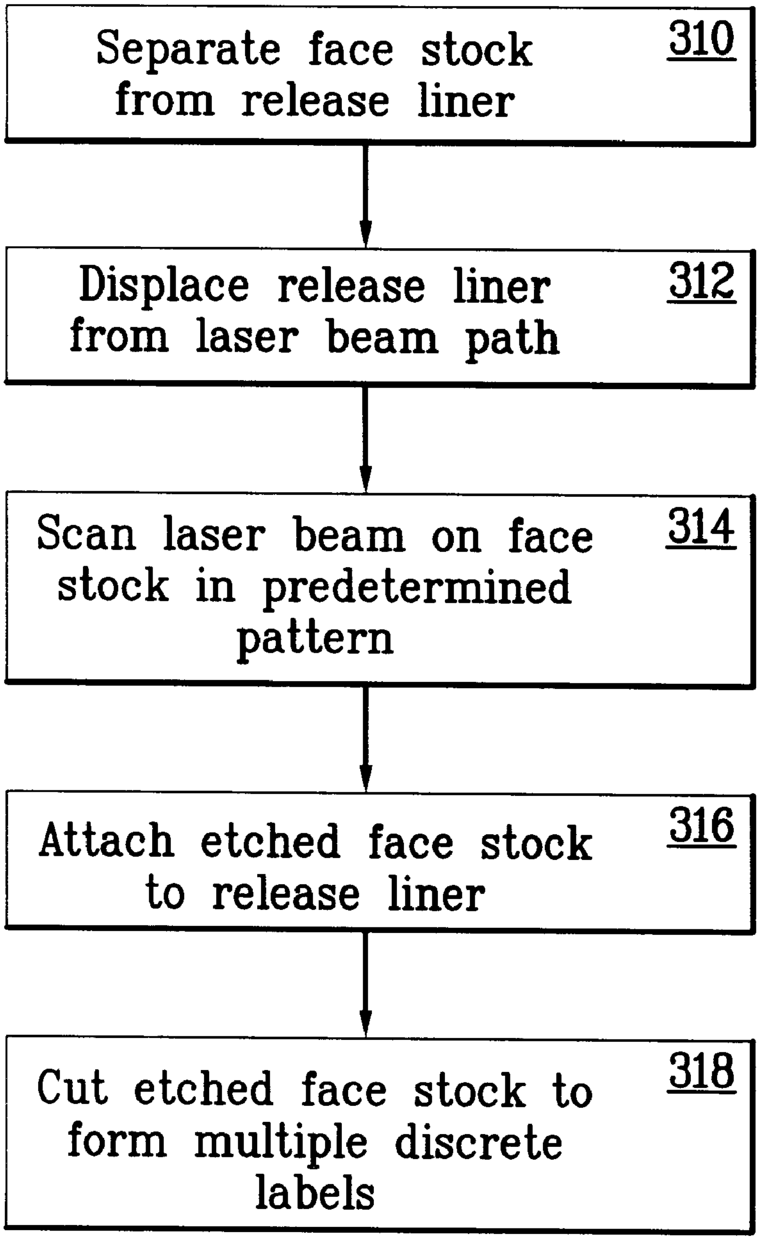
FIG. 3 is a flowchart of preferred method steps for forming discrete etched labels.

The steps of the method embodied by the present invention are depicted in flowchart form in FIG. 3. In step 310, face stock 412*a* is separated from release liner 418*a* by de-laminator 210. Release liner 418*a* is then displaced, step 310, from the path of laser beam 428 such that the release liner 418*a* remains intact. In step 314, laser-etching module 212 directs a laser beam 428 over the face stock 412*b* in a predetermined pattern to thereby produce at least one etched region having a desired geometry. The laser-etched face stock 414 is then attached to release liner 418*g,* step 316, which may comprise the original release liner 418*g* or a new release liner 520. Finally, cutting module 216 cuts laser etched face stock 414 to form multiple discrete labels from the continuous label stock 416.

The invention has been explained above with reference to a preferred embodiment. Other embodiments will be apparent to those skilled in the art in light of this disclosure. For example, the present invention may readily be implemented using configurations other than those described in the preferred embodiment above. Additionally, the present invention may effectively be used in conjunction with systems other than the one described above as the preferred embodiment. Therefore, these and other variations upon the preferred embodiments are intended to be covered by the present invention, which is limited only by the appended claims.

What is claimed is:

1. A method of forming discrete etched labels from a continuous strip of label stock, the label stock including a face stock having a front surface and an adhesive-coated rear surface, the label stock further including a release liner contacting the face stock rear, the method comprising the steps of:

removing the face stock from the release liner;

generating a laser beam having a power density sufficient to etch the face stock by vaporization;

etching the face stock to produce at least one etched region therein by directing the beam in a predetermined pattern over the face stock;

applying a second release liner to the etched face stock; and cutting the face stock at predetermined intervals to form discrete labels, wherein the cutting step leaves the second release liner functionally intact.

2. The method of claim 1 wherein the cutting step is performed by using a second laser beam directed over the face stock.

3. The method of claim 1 wherein the cutting step is performed by a mechanical cutting device.

4. The method of claim 1 further comprising the step of printing a design on the front surface of the face stock.

5. A machine for forming discrete intricately-shaped adhesive labels from a continuous strip of label stock, the label stock including a face stock having a front surface and an adhesive-coated rear surface, the label stock further including a release liner contacting the face stock rear surface, the machine comprising:

means for removing the face stock from the release liner;

an etching system configured to generate a laser beam having a power density sufficient to etch the face stock by vaporization and to direct the beam over the separated portion of the face stock so as to produce at least one etched region in the face stock;

means for applying a second release liner to the face stock; and means for cutting the face stock at predetermined intervals to form multiple discrete labels, the cutting means being configured to cut the face stock while leaving the release liner functionally intact.

6. The machine of claim 5 wherein the cutting means comprises a laser.

7. The machine of claim 5 wherein the cutting means comprises a mechanical cutting device.

8. The machine of claim 5 further comprising means for independently tensioning the separated portions of the face stock and the release liner.

9. The machine of claim 5 further comprising means for printing a design on the front surface of the face stock.

* * * * *